United States Patent
Bhalla et al.

(10) Patent No.: US 7,613,811 B1
(45) Date of Patent: Nov. 3, 2009

(54) SELECTING A COMMUNICATIONS PROTOCOL

(75) Inventors: Rajesh Bhalla, Westmont, IL (US); Hsia R. Yu, Milpitas, CA (US)

(73) Assignee: Cisco Technology, Inc., San Jose, CA (US)

( * ) Notice: Subject to any disclaimer, the term of this patent is extended or adjusted under 35 U.S.C. 154(b) by 1475 days.

(21) Appl. No.: 09/954,320

(22) Filed: Sep. 17, 2001

(51) Int. Cl.
*G06F 15/16* (2006.01)
(52) U.S. Cl. .................. 709/227; 709/228; 709/245; 370/331; 455/436
(58) Field of Classification Search ............... 709/230, 709/227, 228, 245; 370/466, 338, 395.2, 370/328, 331; 455/436
See application file for complete search history.

(56) References Cited

U.S. PATENT DOCUMENTS

| | | | |
|---|---|---|---|
| 6,404,754 B1 | 6/2002 | Lim | 370/338 |
| 6,665,537 B1 | 12/2003 | Lioy | 455/435 |
| 2002/0138622 A1* | 9/2002 | Dorenbosch et al. | 709/227 |
| 2002/0176383 A1* | 11/2002 | Inoue et al. | 370/331 |
| 2002/0181498 A1* | 12/2002 | Hsu et al. | 370/466 |
| 2002/0186696 A1* | 12/2002 | Lim | 370/395.52 |
| 2003/0021252 A1* | 1/2003 | Harper et al. | 370/338 |

\* cited by examiner

*Primary Examiner*—William C Vaughn, Jr.
*Assistant Examiner*—Djenane M Bayard
(74) *Attorney, Agent, or Firm*—Baker Botts L.L.P.

(57) ABSTRACT

According to one embodiment of the present invention, a method, a logic, and systems for selecting a communications protocol are disclosed. An initial request having a static Internet Protocol address is received from a mobile node, and a dynamic address is assigned to the mobile node. A data packet is received from the mobile node, and whether the data packet uses the dynamic address or has a mobile Internet Protocol request is determined. If the data packet has the mobile Internet Protocol request, the data packet is processed using a mobile Internet Protocol process. Alternatively, if the data packet uses the dynamic address, the data packet is processed using a simple Internet Protocol process.

15 Claims, 2 Drawing Sheets

SELECTING A COMMUNICATIONS PROTOCOL

TECHNICAL FIELD OF THE INVENTION

This invention relates in general to packet data networks, and more particularly to selecting a communications protocol.

BACKGROUND OF THE INVENTION

A call comprising packet data is typically communicated in a packet data network according to a communications protocol. In order to process the call, the communications protocol is identified, and the packet data is processed according to the identified communications protocol. Packet data, however, sometimes does not conform to network standards and the communications protocol for the packet data might not be readily identified. As a result, previous techniques for processing packet data are inadequate for many needs.

SUMMARY OF THE INVENTION

In accordance with the present invention, disadvantages and problems associated with packet data networks have been substantially reduced or eliminated.

According to one embodiment of the present invention, a method for selecting a communications protocol is disclosed. An initial request having a static Internet Protocol address is received from a mobile node, and a dynamic address is assigned to the mobile node. A data packet is received from the mobile node, and whether the data packet uses the dynamic address or has a mobile Internet Protocol request is determined. If the data packet has the mobile Internet Protocol request, the data packet is processed using a mobile Internet Protocol process. Alternatively, if the data packet uses the dynamic address, the data packet is processed using a simple Internet Protocol process.

According to one embodiment of the present invention, a system for selecting a communications protocol is disclosed. A processor receives a initial request having a static Internet Protocol address from a mobile node, and assigns a dynamic address to the mobile node. The processor receives a data packet from the mobile node, and determines whether the data packet uses the dynamic address or has a mobile Internet Protocol request. A first protocol module processes the data packet using a mobile Internet Protocol process if the data packet has the mobile Internet Protocol request. A second protocol module processes the data packet using a simple Internet Protocol process if the data packet uses the dynamic address.

According to one embodiment of the present invention, a system for selecting a communications protocol is disclosed. The system includes means for receiving an initial request having a static Internet Protocol address from a mobile node, and means for assigning a dynamic address to the mobile node. The system also includes means for receiving a data packet from the mobile node, and means for determining whether the data packet uses the dynamic address or has a mobile Internet Protocol request. Additionally, the system includes means for processing the data packet using a mobile Internet Protocol process if the data packet has the mobile Internet Protocol request, and means for processing the data packet using a simple Internet Protocol process if the data packet uses the dynamic address.

According to one embodiment of the present invention, logic for selecting a communications protocol is disclosed. The logic receives an initial request having a static Internet Protocol address from a mobile node, and assigns a dynamic address to the mobile node. The logic also receives a data packet from the mobile node, and determines whether the data packet uses the dynamic address or has a mobile Internet Protocol request. Additionally, the logic processes the data packet using a mobile Internet Protocol process if the data packet has the mobile Internet Protocol request, and processes the data packet using a simple Internet Protocol process if the data packet uses the dynamic address.

Important technical advantages of certain embodiments of the present invention may include assigning a dynamic address to a mobile node in order to process a call from the mobile node. If the dynamic address is not assigned, a communications session that allows the mobile node to communicate may be terminated. Other important technical advantages of certain embodiments of the present invention may include identifying the communications protocol of packet data from a mobile node. A packet data serving node checks whether the packet data includes an assigned dynamic address in order to determine the communications protocol needed to process the packet data.

BRIEF DESCRIPTION OF THE DRAWINGS

For a more complete understanding of the present invention and its advantages, reference is now made to the following description, taken in conjunction with the accompanying drawings, in which.

DETAILED DESCRIPTION OF THE INVENTION

Figure 1:
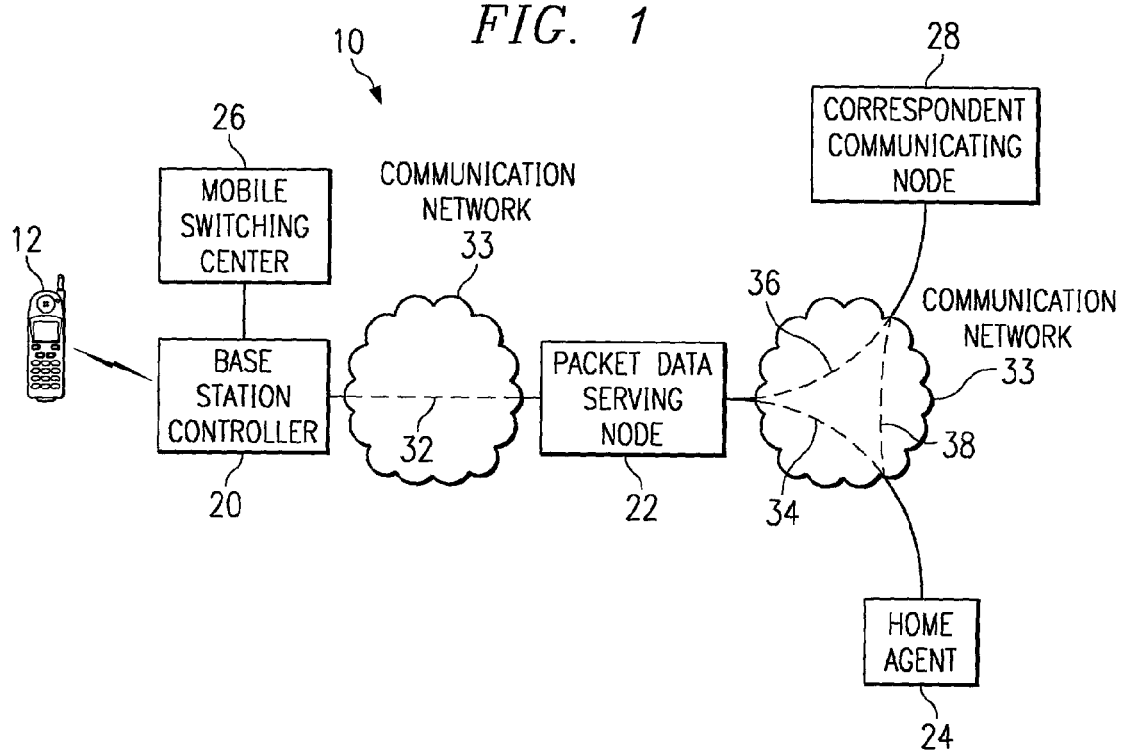
FIG. 1 illustrates an exemplary system for selecting a communications protocol.

FIG. 1 illustrates an exemplary system 10 for selecting a communications protocol for a mobile node 12. Mobile node 12 may support, for example, simple Internet Protocol (IP), mobile IP, or any other suitable communications protocol. To process packet data from mobile node 12, system 10 identifies the communications protocol and processes the packet data according to the identified communications protocol.

Mobile node 12 may include, for example, a personal computer, a personal digital assistant, a mobile handset, or any other device suitable for communicating packet data to system 10. Mobile node 12 may utilize, for example, code-division multiple access technology (CDMA) or any other suitable mobile communications technology. A call from mobile device 12 may comprise packet data such as voice, data, video, multimedia, or other type of data packets, or any combination of the preceding.

System 10 may include a base station controller 20, a packet data serving node 22, a home agent 24, a mobile switching center 26, and a correspondent communicating node 28, which may be used to process a call from mobile node 12. Base station controller 20 provides an interface between mobile node 12 and packet data serving node 22. Base station controller 20 may route a call from mobile node 12 through a base station. The wireless link between mobile node 12 and packet data serving node 22 is typically a radio frequency link that may be cellular in network organization. A communication path 32 may be used to transmit data between base station controller 20 and packet data serving node 22. Communication path 32 may comprise a portion of a communication network 33. Communication network 33 may comprise a public switch telephone network, a public or private data network, the Internet, a wired or wireless network, a local, regional, or global communicating network, other suitable communication link, or any combination of the preceding.

Packet data serving node 22 may establish a communication session, for example, a point-to-point session, with mobile node 12 in order to provide mobile node 12 with access to the packet data network. A communication path 32 may be used to transmit data between base station controller 20 and packet data serving node 22. Packet data serving node 22 may comprise, for example, a CISCO Packet Data Serving Node. Home agent 24 records the location of mobile node 12 and provides mobile IP service to the mobile node 12. Correspondent communicating node 28 may comprise any suitable node with which mobile node 12 may communicate or hold an interactive session, for example, a file transfer protocol (FTP) server or a printer.

A communication path 34 may be used to transmit data between packet data serving node 22 and home agent 24. A communication path 36 may be used to transmit data between packet data serving node 22 and correspondent communicating node 28. A communication path 38 may be used to transmit data between home agent 24 and correspondent communicating node 28. Communication paths 34, 36, and 38 may comprise, for example, a portion of a communication network 33.

Mobile switching center 26 manages base station controller 20, and may also manage communication between system 10 and portions of other systems, which may be similar to system 10. Mobile switching center 26 may include, for example, an open programmable switch such as a CISCO VCO/4K switch, and a system controller program that provides call processing. Mobile switching center 26 may comprise, for example, a CISCO Mobile Switching Center.

Figure 2:
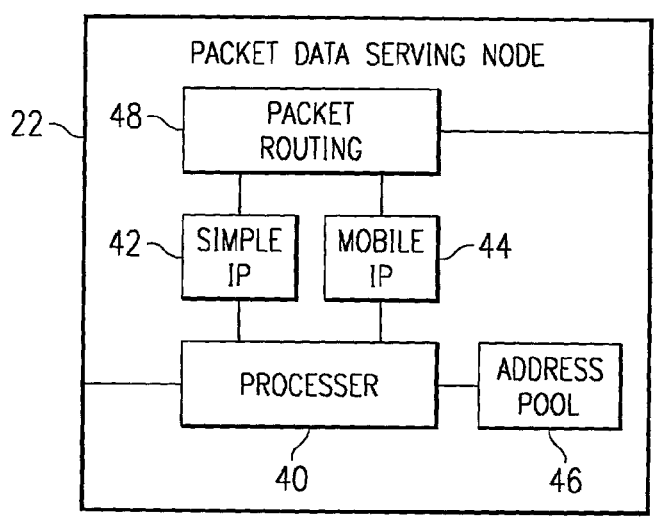
FIG. 2 illustrates an exemplary packet data serving node.

FIG. 2 illustrates an exemplary packet data serving node 22. Packet data serving node 22 may include a processor 40, a simple IP module 42, a mobile IP module 44, an address pool 46, and a packet routing module 48. Processor 40 receives packet data from base station controller 20, identifies the communications protocol used to transmit the packet data, and sends the packet data to the appropriate protocol module to be processed. For example, processor 40 may send data packets to simple IP module 42, which processes data packets according to simple IP, or to mobile IP module 44, which processes data packets according to mobile IP. If processor 40 receives a data packet that includes a topologically incorrect static address such as a non-zero IP address, processor 40 may dynamically assign a topologically correct address from address pool 46.

Mobile IP module 44 may include a mobile IP foreign agent function. Simple IP module 42 and mobile IP module 44 send data packets to packet routing module 48 for transmission to correspondent communicating node 28. Data packets may be routed to correspondent communication node 28 either directly over communication path 36 or routed through the home agent over communication paths 34 and 38.

Figure 3:
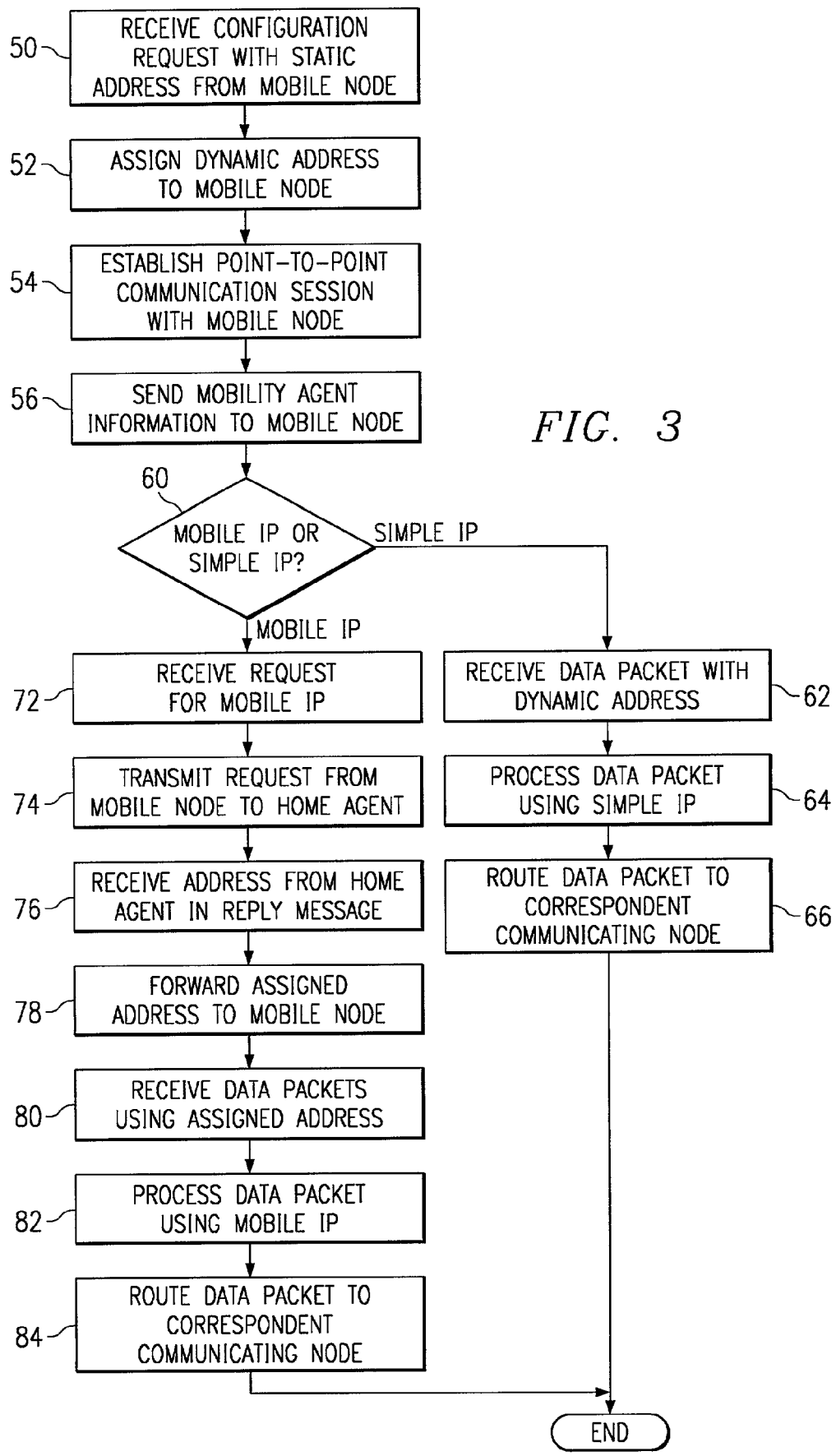
FIG. 3 illustrates an exemplary method for selecting a communications protocol.

FIG. 3 illustrates an exemplary method for selecting a communications protocol. At step 50, packet data serving node 22 receives a request from mobile node 12 that includes a static address that may be topologically incorrect. The request may comprise an IP control protocol (IPCP) configure request. The static address may comprise, for example, a simple IP address expressed as a non-zero IP address, and may be included in an IP address configuration option of the request.

Processor 40 of packet data serving node 22 assigns a dynamic address from address pool 46 to mobile node 12 at step 52, and transmits the dynamic address to mobile node 12. The dynamic address, which may be topologically correct, may be transmitted in an IPCP message such as a negative acknowledgment (NAK) response. If mobile node 12 uses mobile IP, the dynamic address typically does not affect the mobile IP communications stack. Packet data serving node 22 establishes a point-to-point communications session with mobile node 12 at step 54. Mobile node 12 may also be authenticated at step 54. At step 56, packet data serving node 22 sends mobility agent information about the foreign agent function included within mobile IP module 44 to mobile node 12. The mobility agent information may comprise an agent advertisement that includes the address of mobile IP module 46 within packet data serving node 22.

At step 60, mobile node 12 responds using either simple IP or mobile IP. If mobile node 12 uses simple IP, mobile node 12 sends data packets that use the assigned dynamic address as a source address. At step 62, packet data serving node 22 receives data packets from mobile node 12, and processor 40 determines that the data packets use the dynamic address as the source address. At step 64, packet data serving node 22 processes the data packets using simple IP. Processor 40 transmits the data packets to simple IP module 42, which processes the data packets according to simple IP. At step 66, the data packets are forwarded to packet routing module 48, and then routed to correspondent communicating node 28 over communication path 36. After data packets are routed, the method is terminated.

If mobile node 12 uses mobile IP at step 60, mobile node 12 responds to the mobility agent information by sending a request for mobile IP. The request for mobile IP may comprise, for example, a mobile IP registration request or an agent solicitation. At step 72, packet data serving node 22 receives the data packets from mobile node 12, and processor 40 determines that the data packets include the request for mobile IP. Processor 40 transmits the data packets to mobile IP module 44. At step 74, mobile IP module 44 transmits the request to home agent 24 via packet routing module 48. In response, home agent 24 assigns an address to mobile node 12, which mobile IP module 44 receives at step 76 within a mobile IP reply message. At step 78, the home agent assigned address is forwarded to mobile node 12 in a mobile IP registration reply message.

After receiving the home agent assigned address within the mobile IP registration reply, mobile node 12 sends data packets that use the home agent assigned address as a source address. At step 80, packet data serving node 22 receives data packets from mobile node 12, and processor 40 determines that data packets use the home agent assigned address as a source address. Packet data serving node 22 proceeds to step 82 to process data packets using mobile IP. Processor 40 transmits data packets to mobile IP module 44, which processes data packets according to mobile IP. The data packets are forwarded to packet routing module 48 and routed to correspondent communicating node 28 at step 84. Data packets may be routed to correspondent communicating node either directly over communication path 36 or routed through the home agent over communication paths 34 and 38. After the data packets are routed, the method is terminated.

Important technical advantages of certain embodiments of the present invention may include assigning a dynamic address to mobile node 12 in order to process a call from mobile node 12. If the dynamic address is not assigned, a communications session that allows mobile node 12 to communicate may be terminated. Other important technical advantages of certain embodiments of the present invention may include identifying the communications protocol of packet data from mobile node 12. Packet data serving node 22 checks whether the packet data includes an assigned dynamic address or a mobile IP request in order to determine the communications protocol needed to process the packet data.

Although the present invention has been described with several embodiments, a myriad of changes, variations, alterations, transformations, and modifications may be suggested to one skilled in the art, and it is intended that the present invention encompass such changes, variations, alterations, transformations, and modifications as fall within the scope of the appended claims.

What is claimed is:

1. A method for selecting a communications protocol, comprising:

receiving an initial request comprising a static Internet Protocol address from a mobile node;

assigning a dynamic address to the mobile node;

receiving a data packet from the mobile node;

determining, at a packet data serving node, whether the data packet comprises the dynamic address or a mobile Internet Protocol request to select a communications protocol;

processing the data packet at the packet data serving node using a mobile Internet Protocol process if the data packet comprises the mobile Internet Protocol request; and processing the data packet at the packet data serving node using a simple Internet Protocol process if the data packet comprises the dynamic address.

2. The method of claim 1, wherein the static Internet Protocol address comprises a non-zero Internet Protocol address.

3. The method of claim 1, further comprising authenticating the mobile node in response to receiving the initial request.

4. The method of claim 1, wherein the mobile Internet Protocol request comprises a mobile Internet Protocol registration request.

5. The method of claim 1, wherein the mobile Internet Protocol request comprises an agent solicitation.

6. The method of claim 1, further comprising establishing a point-to-point session with the mobile node in response to receiving the initial request.

7. The method of claim 1, wherein processing the data packet using the mobile Internet Protocol process comprises:

transmitting the mobile Internet Protocol request to a home agent;

receiving a mobile Internet Protocol reply from the home agent, the mobile Internet Protocol reply comprising an address assigned to the mobile node; and forwarding the mobile Internet Protocol reply to the mobile node.

8. A system for selecting a communications protocol, comprising:

a processor associated with a packet data serving node operable to:

receive an initial request comprising a static Internet Protocol address from a mobile node;

assign a dynamic address to the mobile node;

receive a data packet from the mobile node; and determine whether the data packet comprises the dynamic address or a mobile Internet Protocol request to select a communications protocol; and a first protocol module coupled to the processor and operable to process the data packet using a mobile Internet Protocol process if the data packet comprises the mobile Internet Protocol request; and a second protocol module coupled to the processor and operable to process the data packet using a simple Internet Protocol process if the data packet comprises the dynamic address.

9. The system of claim 8, wherein the static Internet Protocol address comprises a non-zero Internet Protocol address.

10. The system of claim 8, wherein the processor is operable to authenticate the mobile node in response to receiving the initial request.

11. The system of claim 8, wherein the mobile Internet Protocol request comprises a mobile Internet Protocol registration request.

12. The system of claim 8, wherein the mobile Internet Protocol request comprises an agent solicitation.

13. The system of claim 8, wherein the processor is operable to establish a point-to-point session with the mobile node in response to receiving the initial request.

14. The system of claim 8, wherein the first protocol module is operable to process the data packet using the mobile Internet Protocol process by:

transmitting the mobile Internet Protocol request to a home agent;

receiving a mobile Internet Protocol reply from the home agent, the mobile Internet Protocol reply comprising an address assigned to the mobile node; and forwarding the mobile Internet Protocol reply to the mobile node.

15. A system for selecting a communications protocol, comprising:

a processor with a packet data serving node operable to:

receive a initial request comprising a static Internet Protocol address from a mobile node, the static Internet Protocol address comprising a non-zero Internet Protocol address;

assign a dynamic address to the mobile node;

establish a point-to-point session with the mobile node;

authenticate the mobile node;

receive a data packet from the mobile node; and determine whether the data packet comprises the dynamic address or a mobile Internet Protocol request to select a communications protocol; and a first protocol module coupled to the processor and operable to process the data packet using a mobile Internet Protocol process if the data packet comprises the mobile Internet Protocol request by:

transmitting the mobile Internet Protocol request to a home agent;

receiving a mobile Internet Protocol reply from the home agent, the mobile Internet Protocol reply comprising an address assigned to the mobile node; and forwarding the mobile Internet Protocol reply to the mobile node; and a second protocol module coupled to the processor and operable to process the data packet using a simple Internet Protocol process if the data packet comprises the dynamic address.

* * * * *

UNITED STATES PATENT AND TRADEMARK OFFICE
CERTIFICATE OF CORRECTION

PATENT NO. : 7,613,811 B1 Page 1 of 1
APPLICATION NO. : 09/954320
DATED : November 3, 2009
INVENTOR(S) : Bhalla et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1768 days.

Signed and Sealed this

Nineteenth Day of October, 2010

David J. Kappos
*Director of the United States Patent and Trademark Office*